United States Patent Office 3,461,907
Patented Aug. 19, 1969

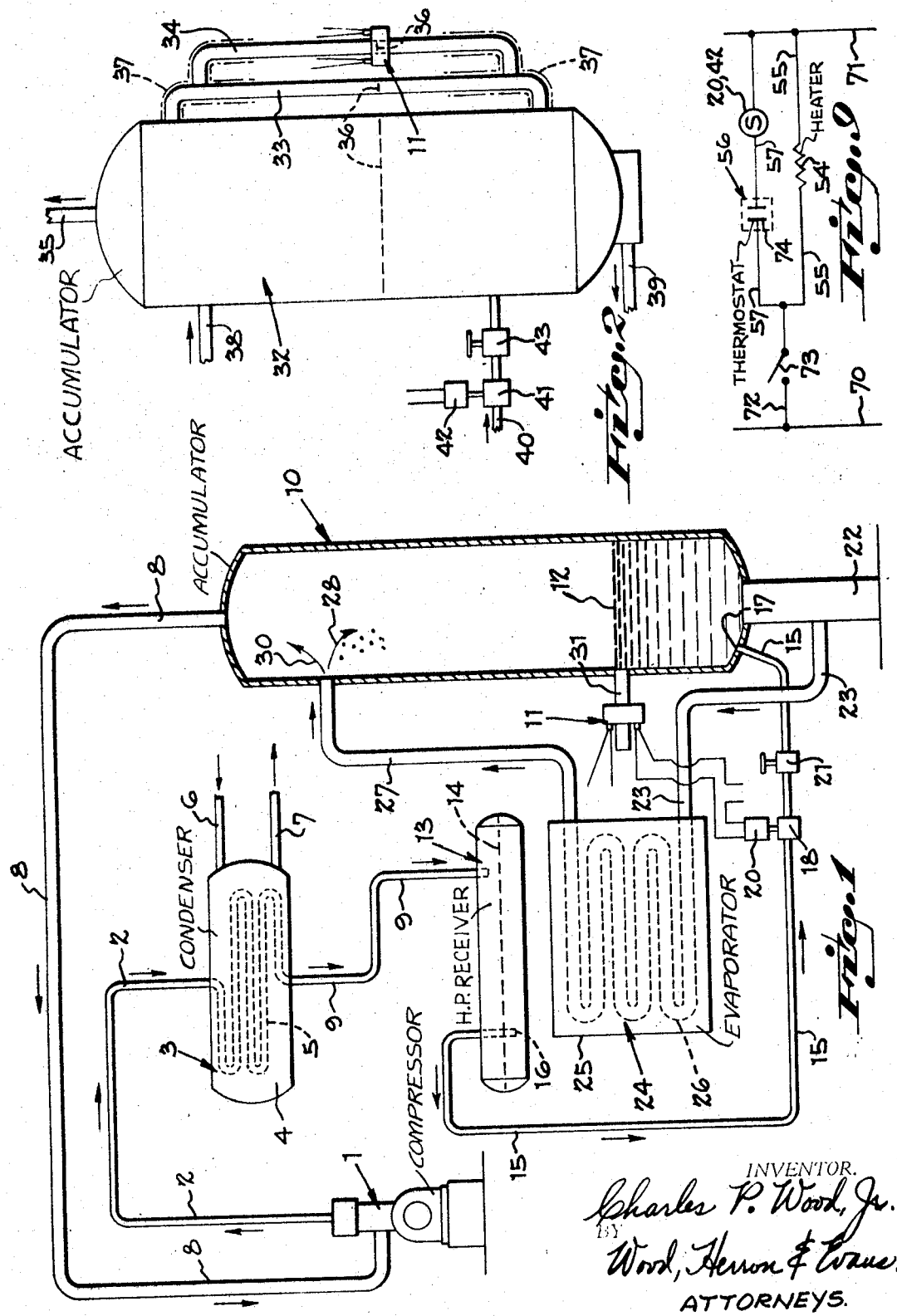

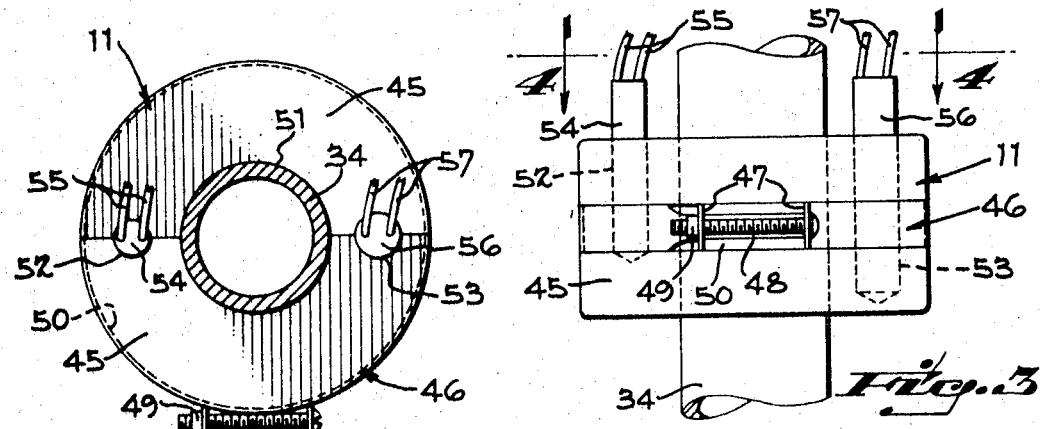
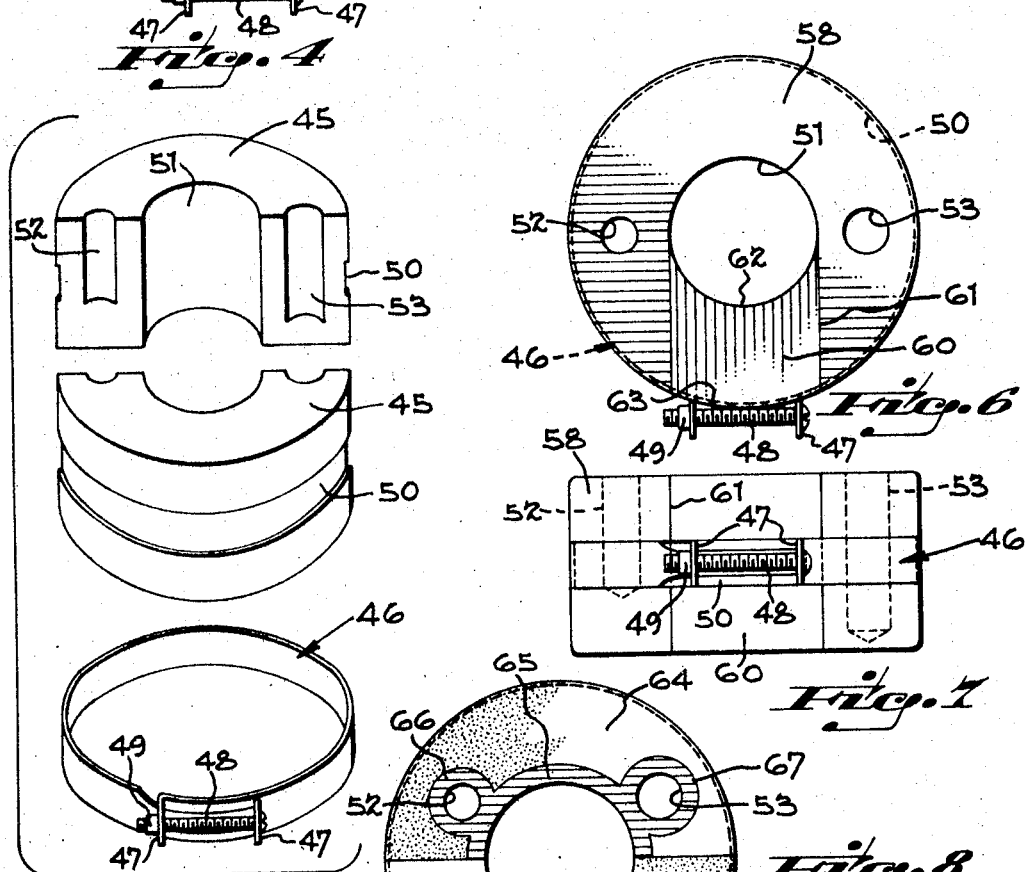
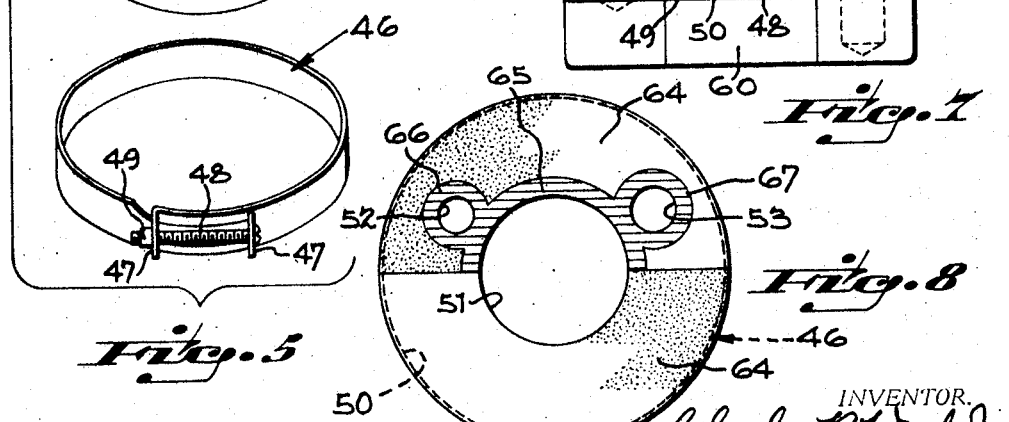

3,461,907
LIQUID LEVEL CONTROL DEVICE FOR REFRIGERATION SYSTEMS
Charles P. Wood, Jr., 1020 Richwood Ave., Cincinnati, Ohio 45226
Filed Aug. 18, 1966, Ser. No. 573,327
Int. Cl. F16k 21/18, 31/08
U.S. Cl. 137—386   3 Claims

ABSTRACT OF THE DISCLOSURE

The disclosure relates to a liquid level control device for a refrigeration system having a vessel containing liquid refrigerant and having a telltale tube or liquid level gauge communicating with the vessel. The control device comprises a heat conduction element clamped in thermal contact about the telltale tube, with a thermostat element mounted within the conduction element and including electrical contacts. The electrical contacts are interconnected in a circuit with an electrical control valve which regulates the supply of liquid refrigerant to the vessel. The arrangement is such that the temperature of the telltale tube, which corresponds with the liquid level in the vessel, is sensed by the conduction element and transmitted to the thermostat element, which in turn operates the supply valve so as to maintain the liquid refrigerant within the vessel at a predetermined level.

---

This invention relates generally to refrigeration systems of the commerical type and more particularly to a liquid level control device or thermal sensor arranged to regulate the level of liquid refrigerant which is maintained within a vessel such as an accumulator which forms a part of the system.

One of the primary objectives of the invention has been to provide a liquid level control device which maintains the liquid level by sensing the temperature within a vessel by thermal conduction through the wall of a telltale tube, without requiring the use of a probe or other internal element which ordinarily is installed through the wall of the pressure vessel.

Generally speaking, the liquid level control device of the invention comprises a conduction ring formed of heat-conducting material and adapted to be clamped about the outside diameter of a telltale tube, such that the temperature is sensed externally by conduction through the wall of the sensing tube. The thermal conduction principle takes advantage of the difference in temperature between the liquid refrigerant which is confined within the vessel and the temperature of the gas above the liquid level.

The conduction ring includes a thermostat having electrical contacts which are interconnected with a solenoid valve inserted in the refrigerant supply line leading to the vessel. The arrangement is such that the thermostat contacts are opened so long as the liquid level within the telltale tube is in proximity to the conduction ring. However, when the liquid refrigerant drops below a predetermined level, then the thermostat contacts are closed, causing the solenoid valve in the supply line to be opened electrically so as to replenish the liquid refrigerant within the vessel.

Another objective of the invention has been to provide a self-contained liquid level control device which is simple in construction and extremely sensitive and reliable in operation so as to respond quickly to relatively slight changes in the liquid level within the telltale tube of the vessel.

According to this aspect of the invention, that is to impart greater sensitivity to the control device, the conduction ring preferably includes, in addition to the thermostat, an electrical heating element which speeds up recovery of temperature when the liquid level drops below the conduction ring of the control device. Otherwise expressed, the heating element normally is ineffective, since it is not able to overcome the chilling effect produced by the liquid refrigerant in the telltale tube; however, when the liquid drops below the predetermined level, then the heating element is able to raise the temperature of the conduction ring so as to cause rapid response in the action of the thermostat in opening the electrically controlled supply valve. The heating element thus applies a small degree of heat externally to the conduction ring from outside the telltale tube, while the liquid refrigerant acts internally from the telltale tube outwardly through the conduction ring to the thermostat. The conduction ring, thermostat, and heating element, constitute a self-contained unit which is mounted on the telltale tube or other portion of the refrigeration system simply and quickly without any machining operations.

In order to facilitate installation of the self-contained liquid level device, the conduction ring may be split diametrically, such that two half-sections may be clamped in place upon the metallic telltale tube to provide an efficient thermal flow through the wall of the telltale tube and through the conduction ring to the thermostat. In the example disclosed herein, the half-sections of the conduction ring are secured in place on the telltale tube by a clamping ring which secures the two half-sections under pressure in metal-to-metal contact with the conduction tube.

A further objective of the invention has been to provide a self-contained liquid level control device which may be installed on a vertical liquid level column and adjusted vertically along the column, thereby to permit adjustment of the liquid refrigerant level within the accumulator in accordance with the requirements of any given refrigeration system.

In refrigeration systems which require adjustability as to the liquid level within the accumulator or other vessel, the accumulator is provided with a vertical column or telltale tube similar to a liquid level gauge, having upper and lower ends communicating with the vessel, such that the liquid level in the column corresponds with the liquid level in the vessel. Accordingly, the liquid level device, through metal-to-metal conduction, responds to the liquid level within the vessel and modulates the flow of liquid refrigerant by operation of the electrical operated valve in the supply line.

In another example, the liquid level device is mounted upon a horizontal telltale tube communicating with the interior of the vessel. In this case, the telltale tube is installed in the vessel at the level which is to be maintained.

The term "telltale tube" as used throughout the specification and claims, refers to the horizontal tube which communicates with the interior of the vessel or to the vertical liquid level column having upper and lower ends communicating with the vessel. As noted above, in a vessel utilizing the horizontal telltale tube, the liquid level is determined by the elevation at which the horizontal telltale tube is located, whereas, the vertical column permits the selective location of the control device, permitting the liquid level to be varied.

It will be understood that the control device of this invention eliminates the use of internal probes, float valves and other mechanical level control devices and thereby eliminates the drilling of holes and other machining operations associated with the controls used in the past. In addition, the structure of the invention eliminates the problem of frosting which is normally associated with the conventional float valves and other mechanical devices and also eliminates the maintenance problems.

It will be understood from the foregoing, that the liquid level device of the invention may also be installed in a commercial refrigeration system to act as a high level alarm, in the event that the level of the liquid refrigerant in the vessel reaches a point beyond that which is normally maintained. In its utility as a high level alarm, the control device may be installed either in a horizontal telltale tube located at a predetermined elevation relative to the vessel, or it may be mounted at a predetermined elevation along a vertical telltale tube.

The various features and advantages of the invention will be more clearly apparent to those skilled in the art from the following description, taken in conjunction with the drawings.

In the drawings:

FIGURE 1 is a diagrammatic view showing a commercial refrigeration system embodying the sensor or liquid level control device of this invention installed in the accumulator to control the liquid level therein.

FIGURE 2 illustrates a modified form of an accumulator which performs the same function as the accumulator in FIGURE 1 but which is provided with a primary liquid level column and a secondary column, with the liquid level control device installed on the secondary column to provide more accurate control of the liquid level.

FIGURE 3 is an enlarged fragmentary side view of a portion of the secondary column shown in FIGURE 2, detailing the construction of the liquid level device. It will be understood that the liquid level device shown in the horizontal position of FIGURE 1 is identical in construction.

FIGURE 4 is a sectional view taken along the line 4—4 of FIGURE 3, further detailing the construction of the split liquid level control device.

FIGURE 5 is an exploded perspective view showing the two sections of the split housing conduction ring of FIGURES 3 and 4, together with the clamping ring which secures the two sections about the vertical telltale tube of FIGURE 2 or about the horizontal telltale tube of FIGURE 1.

FIGURE 6 is a view similar to FIGURE 4 showing a modified form in which the housing of the liquid level device is of one-piece construction, with a plug or insert arranged to be engaged by the clamping ring to secure the housing in clamping engagement with respect to the column.

FIGURE 7 is a side view projected from FIGURE 6, further illustrating the modified structure.

FIGURE 8 is a top plan view of a modification of the structure shown in FIGURE 4, utilizing an aluminum extrusion as part of the split ring housing.

FIGURE 9 illustrates the electrical circuit of the liquid level control device.

Refrigeration system

A conventional refrigeration system selected to illustrate the principles of the liquid level control device is shown diagrammatically in FIGURE 1. It will be understood however, that the control device may be installed in any one of the various commercial refrigeration systems, whether a newly constructed system or an existing one. As noted above, the control device may be installed on any available conduit communicating with a vessel in which a liquid level is to be regulated and without requiring an internal connection or the drilling of holes. Moreover, by virtue of the arrangement, the liquid level to be maintained, may be adjusted simply by raising or lowering the liquid level device with respect to the conduit upon which the device is externally clamped.

The refrigeration system illustrated in FIGURE 1 is of a relatively simple commercial type comprising, in general, a motor-driven compressor indicated generally at 1, which is connected by way of a conduit 2 to a condenser 3. In the present example, the condenser 3 consists essentially of a tank 4 enclosing a condenser coil 5. Water or other coolant is circulated through the tank 4 and about the condenser coil 5 by way of the conduits 6 and 7. The direction of flow of the liquids and gas is indicated by the arrows in FIGURES 1 and 2.

The heat-laden refrigerant, usually ammonia, is supplied in the form of a gas to the compressor 1 by way of a suction line 8 which extends from the accumulator 10, as described later. The liquid level control device or sensor of the invention, which is indicated generally at 11, is installed on the accumulator to maintain the liquid level of refrigerant, which is indicated at 12. As the heat-laden gaseous refrigerant passes by way of conduit 8 to the compressor 1, the gas is compressed and is advanced under high pressure from the compressor 1, by way of conduit 2 to the coil 3 of the condenser, the refrigerant being still in gaseous form at this stage but under high pressure.

As the high pressure ammonia gas passes through the coil 5 of condenser 3 it is cooled and converted to liquid ammonia, which flows by way of the conduit 9 to a high pressure receiver, which is indicated at 13.

It will be understood, that in a typical system of the type herein illustrated, the compressed gas is under relatively high pressure and high temperature as it is advanced from the compressor 1 to the condenser 3. After passing through the condenser and reaching the high pressure receiver 13 by way of conduit 9, the liquid refrigerant is maintained in the receiver under high pressure at low temperature. The temperatures and pressures are adjusted according to the operating conditions of different installations.

The high pressure receiver 13 is partially filled with liquid refrigerant as indicated by the liquid level 14, and the area within the receiver above the liquid level acts as a gas cushion to maintain the liquid ammonia under high pressure to be advanced by way of conduit 15 to the accumulator 10.

The conduit 23, leading from the receiver 10 to the evaporator 24, preferably is thermally insulated to prevent heat exchange, since the refrigerant flowing through this conduit has been reduced in temperature. The accumulator 10 and other parts of the system which conduct chilled refrigerant may also be insulated for the same reason.

It will be noted that the conduit 15, which advances the liquified refrigerant from the receiver 13 to the accumulator 10, draws off the high pressure liquid refrigerant from the bottom portion of the receiver, as indicated at 16. The conduit 15 extends from the receiver to the lower portion of the accumulator 10, as indicated at 17.

The flow of the high pressure liquid refrigerant from the receiver 13 through conduit 15 is regulated by an electrically-operated valve 18, preferably of the solenoid type, the valve 18 being inserted in the conduit 15 and its operation being regulated, in the present example, by a solenoid 20, the valve being of commercial design. As explained later, the operation of the electrically-operated valve 18 is regulated by the liquid level control device, previously indicated at 11, so as to maintain the liquid within the accumulator 10 at or near the level indicated at 12.

In addition to the electrically controlled valve 18, the conduit 15 includes a hand-operated valve 21. This valve is conventional and permits the flow of liquid refrigerant from the receiver 13 to the accumulator 10 to be shut off when it becomes necessary to service the system.

The liquified, chilled refrigerant flows from the vertical standpipe 22 leading from the lower end of the accumulator 10 through a conduit 23 to the evaporator 24, as indicated by the arrows. The purpose of the accumulator 10 is to maintain a supply of liquid refrigerant to be advanced by way of the conduit 23 to the evaporator 24 (or to several evaporators). In the present example, the evaporator 24 comprises a housing 25 in which is enclosed an evaporator coil 26. An expansion valve (not shown) is inserted in the line 23, in the usual way, at its point entry to the evaporator coil 26.

Upon passing through conduit 23 (which is preferably insulated) and through the evaporator coil 26, the chilled liquid refrigerant from the accumulator is allowed to expand and thus absorb heat. The accumulator acts as a collector for the expanded refrigerant, which flows by way of the conduit 27 from the evaporator to the upper portion of the accumulator.

The accumulator also acts as a receiver for the unevaporated refrigerant which may pass through the evaporator coil 26. The unexpanded refrigerant is advanced through the conduit 27 along with the expanded gaseous refrigerant in the form of droplets which flow by gravity to the lower portion of the accumulator 10, as indicated by the arrow 28. The space within the accumulator 10 above the liquid level 12 acts as a reservoir for the gaseous refrigerant passing from the evaporator 24 by way of the conduit 27. The gaseous refrigerant after passage to the accumulator flows, as indicated by the arrow 30, through the suction line 8 and back to the compressor 1 for recirculation through the system.

In the example illustrated in FIGURE 1, the liquid level control device 11 is mounted upon a horizontal telltale tube 31 which communicates with the interior of the accumulator 10. The outer end of tube 31 is sealed off, the arrangement being such that the chilled liquid refrigerant, upon reaching the level previously indicated at 12, enters the tube 31. Upon entering tube 31, the chilled liquid refrigerant chills the telltale tube 31 and the liquid level control device 11, which is in contact with the tube. Chilling of the control device 11 closes the electrically operated valve 18, thereby shutting off the flow of liquid refrigerant from the receiver 13 by way of conduit 15 to the accumulator, thereby to limit the liquid refrigerant to the level indicated at 12.

As the refrigeration system continues to operate with the valve 18 of conduit 15 closed, the liquid level 12 of the accumulator begins to drop. When the liquid level drops below the telltale tube 31, the liquid level control device 11 is activated to reopen the electrically-operated valve 18, thus permitting additional refrigerant to flow from the high pressure receiver and conduit 15 to the accumulator 10.

As explained later, the control device 11 includes a thermostat arranged to regulate the operation of valve 18 in response to temperature changes. In addition, the control device 11 includes an electrically-operated heater element which speeds up the recovery of temperature as the liquid level 12 falls and the liquid refrigerant leaves the telltale tube 31. In other words, as the liquid refrigerant drains from the telltale tube 31, the heating element carries the relatively light load of warming up the metal parts and the low temperature gas within the telltale tube 31; as the temperature rises, the thermostat within the control device 11 closes its contact, thereby to open the electrically-operated valve 18 so as to admit liquid refrigerant into the accumulator 10.

An additional thermostat (not shown) may be used in the circuit to the heater element 54 to prevent overheating of the heater element.

As the liquid level in the accumulator again rises and approaches the level 12, the liquid again flows out into telltale tube 31 so as to chill the control device 11, overcoming the slight warming effect of the heater. This actuates the contacts of the thermostat so as to again break the contact to the electrically-operated valve, thereby to shut off the liquid flow through line 15 to the accumulator 10. It will be seen that the off-on operation of the electrically-operated valve 18 continuously modulates the flow of liquid refrigerant to the accumulator during the constant operation of the refrigeration system.

Modified accumulator

The accumulator 32, which is illustrated in FIGURE 2, performs the same function in the refrigeration system as does the accumulator 10 of FIGURE 1. However, the modified accumulator in FIGURE 2 is provided with a vertical column upon which the thermal sensor or liquid level control device 11 is adjustably mounted. By virtue of this arrangement, the liquid level device may be adjusted at any desired elevation along the vertical column so as to permit the liquid level within the accumulator to be varied in accordance with the requirements of the system in which the accumulator is installed.

As shown in FIGURE 2, the accumulator 32 is provided with a primary metal column 33, the upper and lower ends of which communicate with the interior of the accumulator 32 so as to act as a liquid level gauge. A secondary column or telltale tube 34 includes upper and lower ends communicating with the upper and lower portions of the primary column 33. In the present disclosure, the sensor or liquid level control device 11 is clamped about the secondary column 34 for vertical adjustment.

The purpose of utilizing the primary and secondary columns 33 and 34 is to improve the accuracy in sensing the liquid level by preventing surging, which may occur within the accumulator and within the primary column 33. The surging is brought about primarily by gases which may be generated within the accumulator and in the primary column due to heat infiltration to the chilled liquid refrigerant. The secondary column, which acts as a telltale tube, provides a more nearly solid column of liquid refrigerant, thereby to improve the responsiveness of the sensor.

It will be understood that the columns 33 and 34 are formed of heat-conducting metal, and that the liquid level control device 11 is clamped about the column so as to sense the temperature externally of conduction from the liquid level, as indicated at 36, which corresponds to the refrigerant level within the accumulator. The primary and secondary columns 33 and 34 are insulated, as indicated by the broken lines 37. The insulation 37 should extend about both columns and should terminate at opposite sides of the sensor 11, the insulation preferably being applied after the sensor 11 has been installed and adjusted to its proper level. As noted earlier, the wall of the accumulator insulator 32 may also be insulated, as well as the several conduits of the system.

The accumulator 32 may be installed in the refrigeration system shown in FIGURE 1, in which case the liquid refrigerant from the evaporator enters the accumulator 32 by way of the conduit 38, as indicated by the arrow. The liquid refrigerant from the lower portion of the accumulator 32 goes to the evaporator by way of the conduit 39, as indicated by the arrow. The refrigerant gases from the upper portions of the accumulator 32 flow by way of the conduit 35 back to the compressor, as indicated by the arrow.

The liquid refrigerant from the receiver flows by way of the conduit 40 to the lower portion of the accumulator. The conduit 40 includes an electrically-operated control valve 41, preferably operated by a solenoid 42. The conduit 40 further includes a hand-operated valve 43 for manual operation when it is necessary to service the equipment. The solenoid 42 of valve 41 is in electrical connection with the sensor 11, as explained later with reference to FIGURE 9.

In some systems, in which the accumulator 32 includes the primary column 33 only, the adjustable liquid level device is mounted on this column with good results.

From the foregoing, it will be apparent that the telltale tube, whether the horizontal type 31 (FIGURE 1) or the vertical type 34 (FIGURE 2) performs the same function.

cluding a main on-off switch 73 by means of which the liquid level circuit may be energized or deenergized for servicing the equipment. The branch line 72 includes the parallel lines 55 and 57 (leads previously described— FIGURES 3 and 4) which complete the circuit from the main line 70 to main line 71. The heating element 54 is interposed in the line 55 so as to generate a constant temperature in the neighborhood of 150° F., to provide rapid recovery, as explained earlier.

The thermostat cartridge 56 is inserted in the branch line 57 and the solenoid 20 or 42 of the electrically-operated valve 18 or 41 is also inserted in line 57. As noted earlier, the thermostat includes an actuating element which opens or closes the thermostat contacts, indicated at 74, which are inserted in branch line 57. Accordingly, when the contacts 74 are opened in response to a rise in temperature caused by a falling liquid level 12 or 36, the solenoid valve is energized to open and admit liquid refrigerant to the accumulators until the liquid level is reestablished.

I claim:
1. In a refrigeration system having a vessel containing liquid refrigerant under low temperature, a control device for maintaining the level of liquid refrigerant in said vessel at a predetermined level comprising:
  a telltale tube having an end in communication with the interior of the vessel, whereby the inside surface of the telltale tube is exposed to the liquid refrigerant at a level corresponding to the liquid level of refrigerant within the vessel;
  a conduction element mounted on the telltale tube in thermal contact therewith;
  said conduction element being in the form of a clamping body formed of heat conducting material;
  said clamping body being clamped in thermal contact with the telltale tube;
  a thermostat element mounted within the clamping body, whereby a variation in the level of the liquid refrigerant within the vessel and telltale tube actuates the thermostat element by conduction through the wall of the telltale tube and through the clamping body;
  and electrical contacts in operative connection with the thermostat element;
  the thermostat element actuating said electrical contacts in response to the changes in the temperature of the telltale tube, whereby changes in the level of the liquid refrigerant in the vessel relative to said predetermined level cause said contacts to emit an electrical signal.

2. A liquid level control device as set forth in claim 1 in which the conduction element includes a heating element, the heating element being constantly energized but being normally ineffective, the heating element being effective to raise the temperature of the conduction element when the liquid refrigerant in the telltale tube drops below the predetermined level, thereby to accelerate the response of the thermostat element when the liquid refrigerant in the vessel and telltale tube drops below the predetermined level.

3. In a refrigeration system having a vessel containing liquid refrigerant under low temperature, a control device for maintaining the level of liquid refrigerant in said vessel at a predetermined level comprising:
  a telltale tube formed of metal having at least one end in communication with the interior of the vessel, whereby the inside surface of the telltale tube is exposed to the liquid refrigerant at a level corresponding to the liquid level of refrigerant within the vessel;
  a conduction element comprising a clamping body formed of nonmetallic material including a central bore;
  an insert within said bore formed of metal having a surface exposed within the bore of said telltale tube;
  the clamping body of the conduction element being clamped about the telltale tube with the said metallic insert in metal-to-metal thermal contact with the external surface of the telltale tube;
  a thermostat element mounted within the metallic insert of the conduction element;
  and electrical contacts in operative connection with the said thermostat element;
  the thermostat element actuating said electrical contacts in response to changes in the temperature of the telltale tube, whereby changes in the level of liquid refrigerant in the vessel relative to said predetermined level cause said contacts to emit an electrical signal.

References Cited
UNITED STATES PATENTS
2,240,952  5/1941  Hetzer _____ 137—412 X WILLIAM F. O'DEA, Primary Examiner
D. R. MATTHEWS, Assistant Examiner U.S. Cl. X.R.
62—188; 137—412; 251—131